(12) United States Patent
Su et al.

(10) Patent No.: US 11,460,947 B1
(45) Date of Patent: Oct. 4, 2022

(54) TOUCH SCREEN

(71) Applicant: Himax Technologies Limited, Tainan (TW)

(72) Inventors: Chun-Jen Su, Tainan (TW); Chun-Kai Chuang, Tainan (TW); Cheng-Hung Tsai, Tainan (TW); Po-Hsuan Huang, Tainan (TW); Li-Lin Liu, Tainan (TW); Heng-Xiao Chen, Tainan (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 17/500,647

(22) Filed: Oct. 13, 2021

(51) Int. Cl.
*G06F 3/041* (2006.01)
*G06F 3/04886* (2022.01)

(52) U.S. Cl.
CPC .......... *G06F 3/0416* (2013.01); *G06F 3/0412* (2013.01); *G06F 3/04886* (2013.01)

(58) Field of Classification Search
CPC ... G06F 3/0412; G06F 3/0416; G06F 3/04886
See application file for complete search history.

(56) References Cited

U.S. PATENT DOCUMENTS

| | | | | |
|---|---|---|---|---|
| 2011/0157056 A1* | 6/2011 | Karpfinger | .............. | G06F 3/041 345/173 |
| 2019/0272053 A1* | 9/2019 | Ballan | ...................... | G06F 3/039 |
| 2019/0391671 A1* | 12/2019 | Pfau | ...................... | G06F 3/0393 |
| 2020/0073492 A1* | 3/2020 | Chiu | ...................... | G06F 3/0412 |
| 2020/0117288 A1* | 4/2020 | Lopez | ...................... | G01P 13/04 |
| 2020/0142529 A1* | 5/2020 | Nugraha | ............... | G06F 3/0416 |
| 2021/0048846 A1* | 2/2021 | Hinson | ................. | G06F 3/0362 |
| 2021/0173542 A1* | 6/2021 | Hinson | ................. | G06F 3/0488 |

* cited by examiner

*Primary Examiner* — Ryan A Lubit
(74) *Attorney, Agent, or Firm* — Donald E. Stout; Stout, Uxa & Buyan, LLP

(57) ABSTRACT

A touch screen includes a touch panel including a plurality of touch blocks, and a knob, being touch-sensitive and rotatable, disposed on top of the touch panel. An area of the touch panel not covered with the knob is defined as a first area, an area of the touch panel covered with the knob is defined as a second area, and touch blocks belonging to both the first area and the second area are defined as overlapped blocks. Sense signals associated with the overlapped blocks are de-emphasized.

15 Claims, 3 Drawing Sheets

TOUCH SCREEN

BACKGROUND OF THE INVENTION

1. Field of the Invention

The present invention generally relates to a touch screen, and more particularly to a touch screen with a knob.

2. Description of Related Art

The touch screen has been popularly used as a humane-machine interface adaptable to in-vehicle applications for assisting drivers in driving. The touch panel of the touch screen acts as an input interface of the in-vehicle devices, and is gradually replacing conventional in-vehicle input interfaces such as rotary controller, steering wheel controls and touchpad.

In spite of its versatility and popularity, the touch screen essentially demands some visual attention, which may cause harmful consequences on driving operation and vehicle control, thereby increasing the risk to drivers and other road users. In order to improve this situation, concepts of conventional in-vehicle input devices such as rotary controllers may be adopted in conjunction with the touch screen. However, the improved touch screen ordinarily suffers interference and inaccuracy, particularly with respect to a touch screen controlled by a single-chip driver, that is, touch and display driver integration (TDDI).

A need has thus arisen to propose a novel scheme to overcome drawbacks of the conventional in-vehicle touch screens.

SUMMARY OF THE INVENTION

In view of the foregoing, it is an object of the embodiment of the present invention to provide a touch screen with a knob capable of effectively reducing interference caused by sense signal originating from a touch outside the knob.

According to one embodiment, a touch screen includes a touch panel and a knob. The touch panel includes a plurality of touch blocks. The knob is touch-sensitive and rotatable, and is disposed on top of the touch panel. An area of the touch panel not covered with the knob is defined as a first area, an area of the touch panel covered with the knob is defined as a second area, and touch blocks belonging to both the first area and the second area are defined as overlapped blocks. Sense signals associated with the overlapped blocks are de-emphasized.

DETAILED DESCRIPTION OF THE INVENTION

Figure 1:
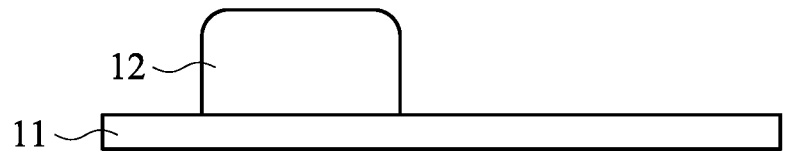
FIG. 1 shows a schematic diagram illustrating a side view of a touch screen according to one embodiment of the present invention.

FIG. 1 shows a schematic diagram illustrating a side view of a touch screen 100 according to one embodiment of the present invention. The touch screen 100 may, but not necessarily, act as a humane-machine input-output interface adaptable to in-vehicle applications for assisting drivers in driving.

Specifically, the touch screen 100 may include a touch panel 11, as an input interface, configured to sense a touch of a user. Although not specifically shown, the touch panel 11 may be constructed and operated in conjunction with a display panel (not shown), as an output interface, to result in the touch screen 100. In the embodiment, the touch panel 11 and the associated display panel are controlled by a single-chip driver, that is, touch and display driver integration (TDDI).

The touch panel 11 may be composed of a plurality of touch blocks (or sensors, electrodes, pixels) capable of respectively sensing the touch of the user, thereby determining touched coordinates of the touch. The touch screen 100 of the embodiment may include a knob 12, which is touch-sensitive and rotatable/pushable, disposed on top of the touch panel 11. In one exemplary embodiment, the knob 12 may be used in vehicle to adjustably increase or decrease volume/temperature, for example, by rotating the knob 12 clockwise or counterclockwise, or to select a function by pushing the knob 12.

Figure 2A:
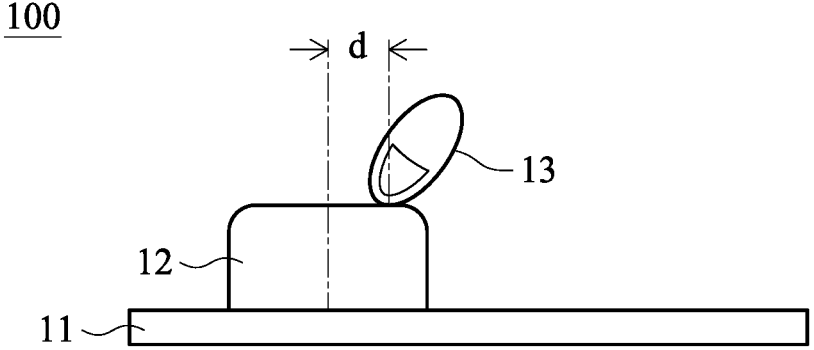
FIG. 2A and FIG. 2B show schematic diagrams each exemplifying a side view of the touch screen.
Figure 2B:
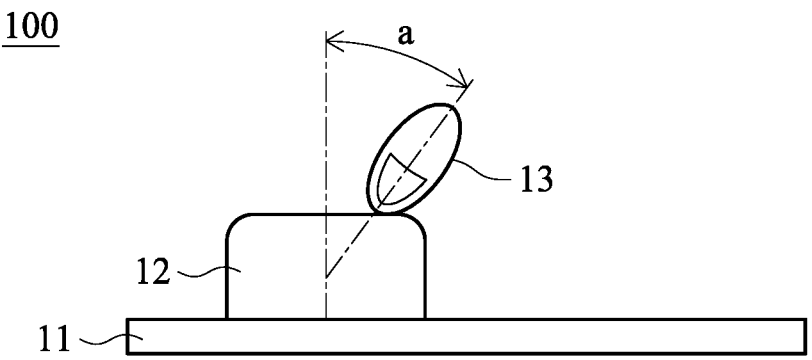

FIG. 2A shows a schematic diagram exemplifying a side view of the touch screen 100, in which the knob 12 is touched by a finger 13. The position of the touch may be recognized by determining a distance d between the touch and a central axis of the knob 12. FIG. 2B shows another schematic diagram exemplifying a side view of the touch screen 100, in which the knob 12 is touched by a finger 13. The position of the touch may be recognized by determining an angle a between the central axis of the knob 12 and the line going through the touch (and the central line of the finger 13).

Figure 3:
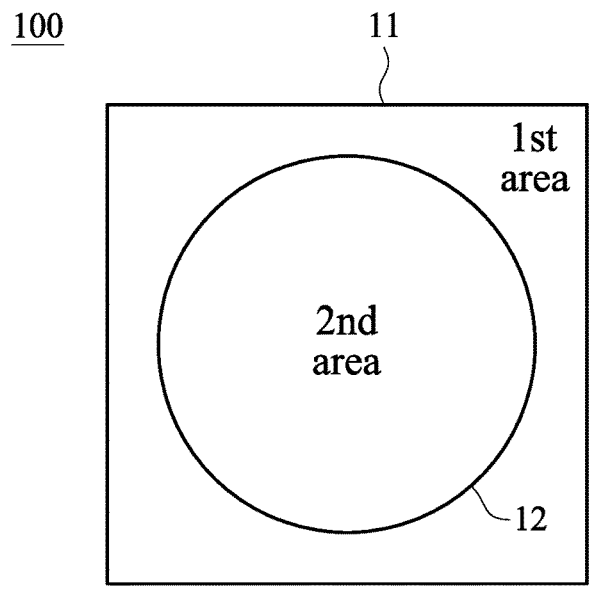
FIG. 3 shows a schematic diagram illustrating a top view of the touch screen according to one embodiment of the present invention.

FIG. 3 shows a schematic diagram illustrating a top view of the touch screen 100 according to one embodiment of the present invention. As demonstrated in FIG. 3, an area that is not covered with the knob 12 is defined as a first area, and an area that is covered with the knob 12 is defined as a second area.

Figure 4A:
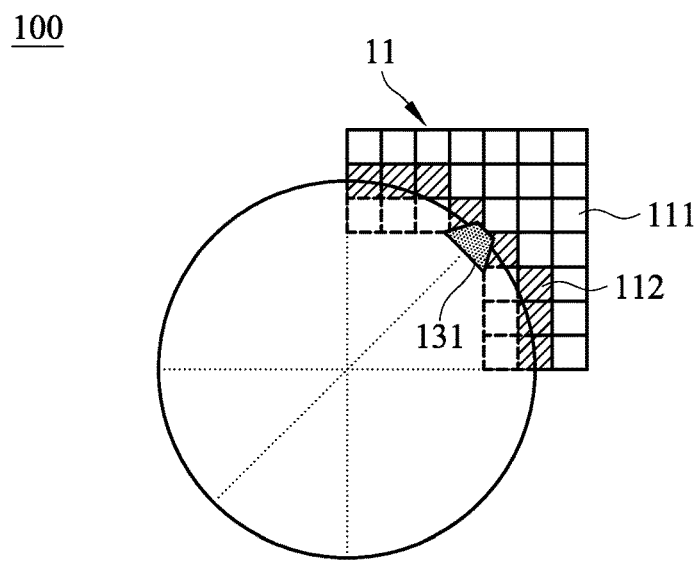
FIG. 4A and FIG. 4B show schematic diagrams each illustrating a top view of the touch screen.

FIG. 4A shows a schematic diagram illustrating a top view of the touch screen 100. FIG. 4A also shows a portion of touch blocks 111 of the touch panel 11, and a (real) touch 131 on the knob 12. In the embodiment, touch blocks 111 that belong to both the first area and the second area are defined as overlapped blocks 112 (as denoted by hatched areas). Alternatively speaking, touch blocks 111 that are covered with a rim of the knob 12 are determined as overlapped blocks 112.

According to one aspect of the embodiment, sense signals associated with the overlapped blocks 112 are de-emphasized (or suppressed). In the embodiment, the sense signals associated with the overlapped blocks 112 are de-emphasized by weighting. For example, the sense signals associated with the overlapped blocks 112 are weighted with lower weights than touch blocks 111 within (or only belonging to) the second area. In one preferred example, the sense signals associated with the overlapped blocks 112 are weighted with weights ranging from 0 to 50%, while the sense signals associated with touch blocks 111 within (or only belonging to) the second area are weighted with weights ranging from 100% and above. It is noted that the sense signals associated with touch blocks 111 within (or only belonging to) the first area may be weighted with weights ranging from 0 to 100% according to specific applications.

In one embodiment, de-emphasizing the sense signals associated with the overlapped blocks 112 (and weighting the sense signals associated with other touch blocks 111) may be executed by a weighting table, which acts as a (digital) weighting filter to suppress the sense signals associated with the overlapped blocks 112.

Figure 4B:
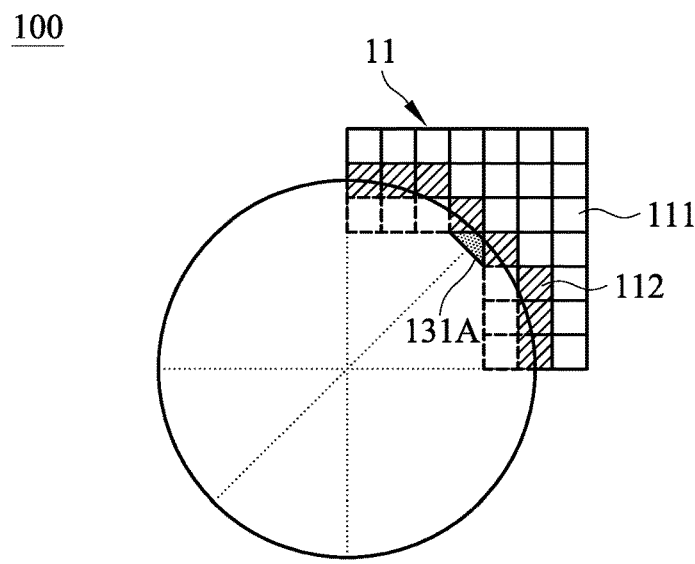

It is noted that, as demonstrated in FIG. 4A, the (real) touch 131 partially occupies neighboring overlapped blocks 112. As the sense signals associated with the overlapped blocks 112 are de-emphasized (or suppressed), an effective touch 131A as demonstrated in FIG. 4B may be produced without occupying neighboring overlapped blocks 112.

Figure 5A:
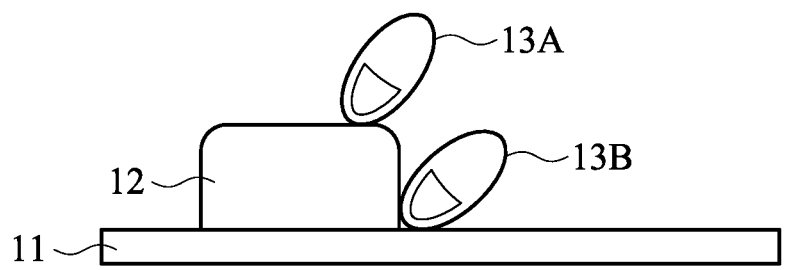
FIG. 5A shows a scenario exemplifying a side view of the touch screen.
Figure 5B:
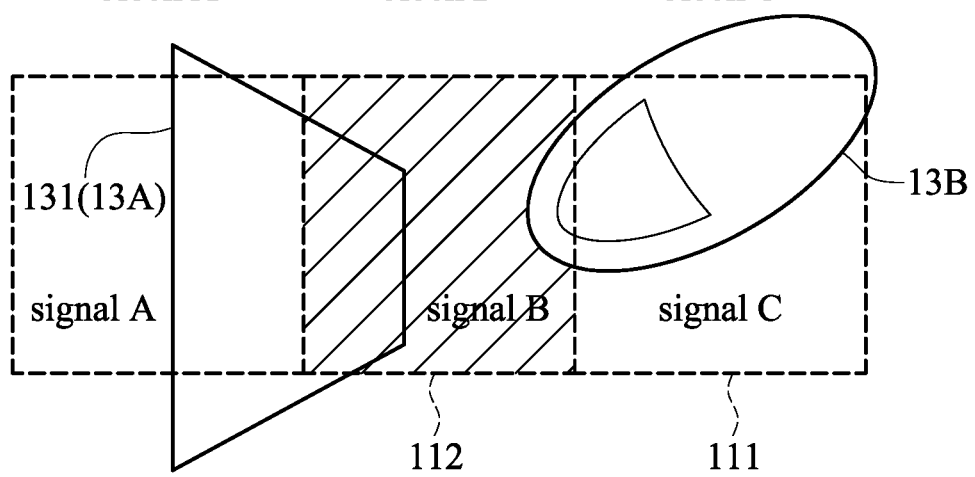
FIG. 5B shows a simplified schematic diagram illustrating a touch on the knob, and three touch blocks and associated sense signals of FIG. 5A.

FIG. 5A shows a scenario exemplifying a side view of the touch screen 100, in which a finger 13A touches the knob 12 and another finger 13B touches the touch panel 11 near the knob 12. FIG. 5B shows a simplified schematic diagram illustrating a touch 131 on the knob 12, and three touch blocks A-C and associated sense signals A-C of FIG. 5A. While determining the position of the touch 131 (by the finger 13A), the sense signal associated with the touch 131 is interfered with (or corrupted by) the sense signal B associated with the overlapped block 112 (i.e., touch block B), to which the sense signals associated with both fingers 13A and 13B contribute. Alternatively speaking, the sense signal associated with the finger 13A cannot be differentiated from the sense signal associated with the finger 13B. However, as disclosed above, the sense signal B associated with the overlapped block 112 is de-emphasized, for example, with lower weight. Therefore, the interference can be substantially reduced, and the sense signals associated with the finger 13A and the finger 13B can be differentiated.

As shown in FIG. 5B, the sense signal associated with the touch 131 (by the finger 13A) is also reduced due to de-emphasis in the overlapped block 112. Accordingly, in one embodiment, the reduction in the sense signal may be compensated, for example, by normalization. Specifically, sense signals associated with touch blocks 111 within the knob 12 (that is, only belonging the second area as shown in FIG. 3) may be normalized by globally applying a gain (which is based on a peak/highest signal level) to the sense signals associated with touch blocks 111 within the knob 12, that is, peak normalization. In one exemplary embodiment, the gain may be obtained according to the peak signal level and its neighboring (e.g., eight) signal levels.

Although specific embodiments have been illustrated and described, it will be appreciated by those skilled in the art that various modifications may be made without departing from the scope of the present invention, which is intended to be limited solely by the appended claims.

What is claimed is:

1. A touch screen, comprising:
a touch panel including a plurality of touch blocks; and
a knob, being touch-sensitive and rotatable, disposed on top of the touch panel;
wherein an area of the touch panel not covered with the knob is defined as a first area, an area of the touch panel covered with the knob is defined as a second area, and touch blocks belonging to both the first area and the second area are defined as overlapped blocks;
wherein sense signals associated with the overlapped blocks are de-emphasized.

2. The touch screen of claim 1, which is controlled by a single-chip driver.

3. The touch screen of claim 1, which is controlled by a touch and display driver integration (TDDI) driver.

4. The touch screen of claim 1, wherein the knob is further pushable.

5. The touch screen of claim 1, wherein a touch sensed by the knob is recognized by determining a distance between the touch and a central axis of the knob.

6. The touch screen of claim 1, wherein a touch sensed by the knob is recognized by determining an angle between a central axis of the knob and a line going through the touch.

7. The touch screen of claim 1, wherein the sense signals associated with the overlapped blocks are de-emphasized by weighting.

8. The touch screen of claim 7, wherein the weighting is executed by a weighting table.

9. The touch screen of claim 7, wherein the sense signals associated with the overlapped blocks are weighted with lower weights than touch blocks within the second area.

10. The touch screen of claim 9, wherein the sense signals associated with the overlapped blocks are weighted with weights ranging from 0 to 50%.

11. The touch screen of claim 9, wherein sense signals associated with touch blocks within the second area are weighted with weights ranging from 100% and above.

12. The touch screen of claim 9, wherein sense signals associated with touch blocks within the first area are weighted with weights ranging from 0 to 100%.

13. The touch screen of claim 1, wherein the sense signals after de-emphasis are compensated.

14. The touch screen of claim 13, wherein the sense signals are compensated by normalization.

15. The touch screen of claim 14, wherein the normalization is executed by globally applying a gain to sense signals associated with touch blocks within the knob.

* * * * *